US009788089B2

(12) United States Patent
Sato et al.

(10) Patent No.: US 9,788,089 B2
(45) Date of Patent: Oct. 10, 2017

(54) OPTICAL CROSS-CONNECT

(71) Applicant: JAPAN SCIENCE AND TECHNOLOGY AGENCY, Kawaguchi-shi, Saitama (JP)

(72) Inventors: Ken-ichi Sato, Nagoya (JP); Hiroshi Hasegawa, Nagoya (JP); Hiroto Ishida, Nagoya (JP)

(73) Assignee: JAPAN SCIENCE AND TECHNOLOGY AGENCY, Kawaguchi-shi (JP)

( * ) Notice: Subject to any disclaimer, the term of this patent is extended or adjusted under 35 U.S.C. 154(b) by 0 days.

(21) Appl. No.: 14/900,411

(22) PCT Filed: Jun. 11, 2014

(86) PCT No.: PCT/JP2014/065519
§ 371 (c)(1),
(2) Date: Dec. 21, 2015

(87) PCT Pub. No.: WO2014/203789
PCT Pub. Date: Dec. 24, 2014

(65) Prior Publication Data
US 2016/0142797 A1 May 19, 2016

(30) Foreign Application Priority Data

Jun. 20, 2013 (JP) ................................ 2013-130034

(51) Int. Cl.
*H04Q 11/00* (2006.01)
*H04J 14/02* (2006.01)
*H04Q 3/52* (2006.01)

(52) U.S. Cl.
CPC ...... *H04Q 11/0005* (2013.01); *H04J 14/0212* (2013.01); *H04J 14/0217* (2013.01);
(Continued)

(58) Field of Classification Search
USPC ................................................ 398/45–57, 83
See application file for complete search history.

(56) References Cited

U.S. PATENT DOCUMENTS 4,932,735 A * 6/1990 Koai ....................... G02F 1/313
385/17
5,467,211 A * 11/1995 Haney ................ H04Q 11/0005
398/45

(Continued)

FOREIGN PATENT DOCUMENTS

FR 2937815 A1 4/2010
JP 2008-252664 A 10/2008
JP 2011-061637 A 3/2011

OTHER PUBLICATIONS

Iwai et al; "Larger Capacity Photonic Node Architecture that Utilizes Stacked Small Scale Optical Cross-connects;" Department of Electrical Engineering and Computer Science, Nagoya University; Mar. 6, 2012; p. 484.

(Continued)

Primary Examiner — Agustin Bello
(74) Attorney, Agent, or Firm — Oliff PLC

(57) ABSTRACT

An optical add-drop apparatus dropping a signal in input optical fibers in an optical cross-connect apparatus or adding a signal into output optical fibers from the cross-connect apparatus, optical cross-connect portions of the cross-connect apparatus connected such that a cross-connect portion internal connection output port is directly connected to an internal connection input port of another cross-connect portion and is indirectly connected via the other cross-connect portion to an internal connection output port of a further cross-connect portion, the add-drop apparatus having: photocouplers connected to part or all of the input fibers connected to each cross-connect portion; and drop signal receiving apparatuses each having optical switches each (Continued)

receiving and alternately selecting a signal output from photocouplers connected to respective different cross-connect portions of the cross-connect portions out of the photocouplers, the drop signal receiving apparatuses selecting a signal of a wavelength for each signal respectively output from the optical switches.

8 Claims, 15 Drawing Sheets

(52) U.S. Cl.
CPC .......... *H04J 14/0219* (2013.01); *H04Q 3/52* (2013.01); *H04Q 2011/0007* (2013.01); *H04Q 2011/0015* (2013.01); *H04Q 2011/0037* (2013.01); *H04Q 2011/0052* (2013.01); *H04Q 2213/1301* (2013.01)

(56) References Cited

U.S. PATENT DOCUMENTS

| | | | | |
|---|---|---|---|---|
| 6,335,930 | B1* | 1/2002 | Lee | H04L 49/101 370/387 |
| 6,704,307 | B1* | 3/2004 | Graves | H04Q 11/0478 370/372 |
| 6,842,554 | B2* | 1/2005 | Nishi | H04J 14/0209 385/17 |
| 7,239,772 | B2* | 7/2007 | Wang | H04J 14/0208 385/17 |
| 7,620,321 | B2* | 11/2009 | Miura | H04J 14/0209 398/45 |
| 7,933,266 | B2* | 4/2011 | Zadikian | H04J 14/0227 370/350 |
| 7,933,519 | B2* | 4/2011 | Akiyama | H04J 14/0209 398/48 |
| 7,983,560 | B2* | 7/2011 | Maki | H04J 14/0204 398/48 |
| 8,131,152 | B2* | 3/2012 | Akiyama | H04J 14/0204 398/83 |
| 8,412,042 | B2* | 4/2013 | Ghioni | H04J 14/0212 398/3 |
| 9,456,260 | B2* | 9/2016 | Mehrvar | H04Q 11/0005 |
| 9,491,120 | B2* | 11/2016 | Mehrvar | H04L 49/25 |
| 2002/0030867 | A1* | 3/2002 | Iannone | H04J 14/0295 398/49 |
| 2002/0109879 | A1* | 8/2002 | Wing So | H04J 7/00 398/58 |
| 2002/0176131 | A1* | 11/2002 | Walters | G06F 8/65 398/58 |
| 2002/0186434 | A1* | 12/2002 | Roorda | H04J 14/0204 398/82 |
| 2003/0016416 | A1* | 1/2003 | Wolf | H04J 3/0685 398/52 |
| 2003/0128986 | A1* | 7/2003 | Tai | G02B 6/272 398/84 |
| 2003/0185565 | A1* | 10/2003 | Wang | H04J 14/0212 398/49 |
| 2003/0185566 | A1* | 10/2003 | Nishi | H04J 14/0291 398/56 |
| 2004/0057726 | A1* | 3/2004 | Penninckx | H04Q 11/0005 398/50 |
| 2004/0071468 | A1* | 4/2004 | Doh | H04Q 11/0066 398/59 |
| 2008/0317466 | A1* | 12/2008 | Chung | H04J 14/0204 398/59 |
| 2009/0041457 | A1* | 2/2009 | Maki | H04J 14/0204 398/45 |
| 2009/0208203 | A1* | 8/2009 | Chiu | H04J 14/0246 398/16 |
| 2010/0014863 | A1 | 1/2010 | Zami et al. | |
| 2011/0262141 | A1* | 10/2011 | Ghioni | H04J 14/0212 398/83 |
| 2015/0055951 | A1* | 2/2015 | Mehrvar | H04Q 11/0005 398/45 |
| 2016/0142797 | A1* | 5/2016 | Sato | H04J 14/0212 398/50 |

OTHER PUBLICATIONS

Sep. 2, 2014 Search Report issued in International Patent Application No. PCT/JP2014/065519.
Feb. 6, 2017 Search Report issued in European Application No. 14813806.8.

* cited by examiner

OPTICAL CROSS-CONNECT

TECHNICAL FIELD

The present invention relates to an optical cross-connect apparatus disposed in an optical network and capable of outputting an input wavelength division multiplexing light from a desired output port on the basis of a wave band or a wavelength.

BACKGROUND ART

An optical network is known that transmits wavelength division multiplexing (WDM) light acquired by multiplexing (combining) optical signals of a predetermined bit rate on the order of GHz to THz for each of multiple wavelengths respectively corresponding to multiple wavelength channels (wave channels or light paths) divided by, for example, 100 GHz in a predetermined communication wavelength band, from a predetermined optical node to a plurality of other optical nodes through one or more optical input fibers (e.g., m fibers) and one or more optical output fibers (e.g., n fibers) (the number of fibers may be or may not be constant between optical nodes) in parallel among the optical nodes. The number of the optical input fibers, for example, m, includes the number of optical fibers from a plurality of optical nodes, and the number of the optical output fibers, for example, n, includes the number of optical fibers to a plurality of optical nodes. In such an optical network, an optical cross-connect apparatus making up each optical node performs routing of wavelength division multiplexing optical signals transmitted through optical fibers directly in the form of optical signals on the basis of a wavelength, thereby implementing large-capacity transmission with low power consumption. For example, this corresponds to an optical cross-connect apparatus described in Patent Document 1.

Because a traffic amount is predicted to increase at an accelerated rate in the optical network due to the recent spread of ADSL and FTTH and the spread of services such as high-definition moving image distribution, it is desired to increase the numbers of wavelength paths and optical fibers, i.e., to further increase the scale of the optical cross-connect apparatuses making up the optical nodes.

PRIOR ART DOCUMENT

Patent Document

Patent Document 1: Japanese Laid-Open Patent Publication No. 2008-252664

SUMMARY OF THE INVENTION

Problem to Be Solved by the Invention

Although, for example, a conventional optical cross-connect apparatus described in Patent Document 1 has a configuration using a wavelength selective switch (WSS), the scale thereof is limited to at most about 1*20, which makes it difficult to configure a large-scale optical cross-connect apparatus. In particular, when the wavelength selective switch (WSS) using MEMS mirrors used in the optical cross-connect apparatus is functioned as, for example, a demultiplexer (wave separator), the switch employs a configuration in which a wavelength is selected from a wavelength division multiplexing light by a diffraction grating dispersing the light output from an end surface of an input optical fiber, a condensing lens condensing the light dispersed by the diffraction grating onto MEMS mirrors of the same number as the demultiplexed (split) wavelengths, and a three-dimensionally configured spatial optical system making the light selectively reflected by the MEMS mirrors incident on one of end surfaces of a plurality of output optical fibers through the condensing lens and the diffraction grating and, therefore, because an increase in the number of output ports not only makes the wavelength selective switch expensive due to the necessity of high-precision processing but also increases an optical loss, the maximum number of the ports is limited to at most about 20 without considering the price in existing wavelength selective switches, and it is practically difficult to implement a larger scale of the optical cross-connect apparatus. Although 1*9 wavelength selective switches are widely used in reality, even the wavelength selective switches of this scale cost about one million yen each.

A wavelength multiplexing signal in an optical fiber input to the optical cross-connect apparatus is made up of, for example, about 100 wavelength units and if the signals are transmitted through, for example, 20 input optical fibers, an optical signal drop apparatus requires an extremely large-scale optical switch for extracting and dropping a desired signal out of 2000 signals at a predetermined optical node and this is difficult to implement. Similarly, when a desired signal is added to a wavelength multiplexing signal transmitted through an optical fiber of a desired path among, for example, 20 output optical fibers at a predetermined optical node, an optical signal add apparatus requires an extremely large-scale optical switch and this is difficult to implement.

The present invention was conceived in view of the situations and it is therefore an object of the present invention to significantly reduce a hardware scale of an optical add-drop apparatus dropping a desired signal in an input optical fiber input to an optical cross-connect apparatus or adding a desired signal into an output optical fiber output from the optical cross-connect apparatus at an optical node in an optical network.

Means for Solving the Problem

To achieve the above object, a first aspect of the invention provides an optical add-drop apparatus (a) dropping a desired signal in a plurality of input optical fibers input to an optical cross-connect apparatus disposed in an optical node in an optical network or adding a desired signal into a plurality of output optical fibers output from the optical cross-connect apparatus, (b) the optical cross-connect apparatus including multiple optical cross-connect portions each having internode connection input ports and internode connection output ports respectively connected to a part of the plurality of input optical fibers and a part of the plurality of output optical fibers, as well as an internal connection input port and an internal connection output port, (c) the multiple optical cross-connect portions each being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion, the optical add-drop apparatus (d) comprising: a plurality of photocouplers connected to a part of or all of the input optical fibers connected to each of the multiple optical cross-connect portions; and a plurality of drop signal receiving apparatuses each having a group of optical switches each receiving and alternately selecting a signal output from a group of photocouplers connected to respective different optical cross-connect portions of the multiple optical cross-connect portions out of the plurality of photocouplers, the plurality of drop signal receiving apparatuses each selecting a signal of a desired wavelength for each of signals respectively output from the group of optical switches.

To achieve the above object, a second aspect of the invention provides an optical add-drop apparatus (a) dropping a desired signal in a plurality of input optical fibers input to an optical cross-connect apparatus disposed in an optical node in an optical network or adding a desired signal into a plurality of output optical fibers output from the optical cross-connect apparatus, (b) the optical cross-connect apparatus including multiple optical cross-connect portions each having internode connection input ports and internode connection output ports respectively connected to a part of the plurality of input optical fibers and a part of the plurality of output optical fibers, as well as an internal connection input port and an internal connection output port, (c) the multiple optical cross-connect portions each being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion, the optical add-drop apparatus (d) comprising: a plurality of photocouplers connected to a part of or all of the output optical fibers connected to each of the multiple optical cross-connect portions; and a plurality of add signal sending apparatuses each having a group of optical switches outputting a signal of a desired wavelength to any one of photocouplers in a group of photocouplers connected to respective different optical cross-connect portions of the multiple optical cross-connect portions out of the plurality of photocouplers.

Effects of the Invention

The optical add-drop apparatus recited in the first aspect of the invention, constructed as described above includes a plurality of the photocouplers connected to a part of or all of the input optical fibers respectively connected to the multiple optical cross-connect portions; and a plurality of the drop signal receiving apparatus each having a group of the optical switches each receiving and alternatively selecting a signal output from a group of photocouplers connected to respective different optical cross-connect portions of the multiple optical cross-connect portions out of the plurality of the photocouplers, the plurality of drop signal receiving apparatus each selecting a signal of a desired wavelength for each of signals respectively output from the group of the optical switches and, therefore, as compared to a conventional optical drop apparatus that includes multiple-stage photocouplers whose number is several times larger than the number of input optical fibers because of a multiple-stage configuration for extracting an arbitrary wavelength out of the wavelengths transmitted through each of the input optical fibers and optical switches selecting the light from the multiple-stage photocouplers whose number is acquired by multiplying the number of all the waves (=the number of fibers*the number of multiplexed wavelengths per fiber) by a drop rate so as to selectively extract a light of a predetermined wavelength from the output lights from the optical switches, the number of the photocouplers is made smaller and the scale of the optical switches is significantly reduced, so that the scale of the optical add-drop apparatus can significantly be reduced.

The optical add-drop apparatus recited in the second aspect of the invention includes a plurality of the photocouplers connected to a part of or all of the output optical fibers respectively connected to the multiple optical cross-connect portions; and a plurality of the add signal sending apparatuses each having a group of the optical switches outputting a signal of a desired wavelength to any one of photocouplers in a group of photocouplers connected to respective different optical cross-connect portions of the multiple optical cross-connect portions out of the plurality of the photocouplers and, therefore, as compared to a conventional optical add apparatus that includes multiple-stage photocouplers whose number is several times larger than the number of input optical fibers because of a multiple-stage configuration for adding an arbitrary wavelength into a desired output optical fiber and optical switches selecting and outputting a desired optical signal to the multiple-stage photocouplers whose number is acquired by multiplying the number of all the waves (=the number of fibers*the number of multiplexed wavelengths per fiber) by a drop rate so as to selectively output a light of a predetermined wavelength from the output lights from the optical switches to a desired output optical fiber, the number of the photocouplers is made smaller and the scale of the optical switches is significantly reduced, so that the scale of the optical add-drop apparatus can significantly be reduced.

The optical cross-connect apparatus recited in the first and second aspects of the invention includes the multiple optical cross-connect portions (sub-systems) each having internode connection input ports and the internode connection output ports respectively connected to multiple internode connection optical fibers as well as the internal connection input ports and the internal connection output ports and, since each of the multiple optical cross-connect portions is connected such that an internal connection output port of a predetermined optical cross-connect portion is directly connected to an internal connection input port of another optical cross-connect portion and is indirectly connected via said another optical cross-connect portion to an internal connection input port of a further optical cross-connect portion, the routing can mutually be performed among the optical cross-connect portions and, therefore, as compared to a conventional optical cross-connect apparatus having the same blocking rate at the same number of fibers, the scale of hardware such as the optical cross-connect portions or the wavelength selective switches can significantly be reduced while a path accommodation capacity is maintained at the same level.

Preferably, the number of the multiple groups of the optical switches is equal to the number of the input optical fibers input to each of the optical cross-connect portions or the number of the output optical fibers output from the optical cross-connect portions. Consequently, the number of the photocouplers is preferably made smaller and the scale is reduced.

Preferably, the drop of the optical signal is limited by a predefined add-drop rate for each of the groups of input optical fibers respectively input to the multiple optical cross-connect portions out of the plurality of input optical fibers, i.e., for each of the optical cross-connect portions. The addition (add) of the optical signal is limited by a predefined add-drop rate for each of the groups of output optical fibers respectively output from the multiple optical cross-connect portions out of the plurality of output optical fibers, i.e., for each of the optical cross-connect portions. Since the drop-limited input optical fibers or the add-limited output optical fibers is disposed with an optical branch element such as a photocoupler or a 1*2-wavelength selective switch branching a light to a photocoupler or adding a light from the photocoupler in accordance with a predetermined drop rate, the number or the scale of the optical branch elements can be made smaller.

Preferably, the number of droppable wavelengths is limited to a predefined add-drop rate for each of the multiple transponder banks in accordance with a drop rate determined in advance from a multiplexing signal input to the transponder bank. For each of the multiple transponder banks, the number of wavelengths added to the multiplexing signal output from each of the transponder banks is limited in accordance with a predefined add-drop rate. This limitation for each of transponder banks the is convenient for reducing the scale of the add-drop portions.

Preferably, the total number of droppable wavelengths is limited by a predefined add-drop rate in accordance with a drop rate determined in advance on the basis of the plurality of input optical fibers. The total number of addable wavelengths is limited by a predefined add-drop rate in accordance with an add rate determined in advance on the basis of the plurality of output optical fibers. In this case, the limitation by the predetermined drop and add rates can easily be set for each of the multiple groups of the optical switches. If it is attempted to put limitations by the predetermined drop and add rates on the entire node, a wasteful configuration is required and the design is complicated because wavelengths are different in each of the optical cross-connect portions.

Preferably, the total number of droppable wavelengths is limited in accordance with a predetermined add-drop rate on the basis of the wavelengths making up the multiplexing signals transmitted through the plurality of input optical fibers. The total number of addable wavelengths is limited in accordance with a predetermined add-drop rate on the basis of the wavelengths making up the multiplexing signals added to the plurality of output optical fibers. In this case, the number or the scale can be made smaller in wavelength selective elements selecting a drop wavelength or wavelength selective elements outputting an add wavelength in the drop signal receiving apparatuses or the add signal sending apparatuses.

MODES FOR CARRYING OUT THE INVENTION

Embodiments of the present invention will now be described in detail with reference to the drawings.

First Embodiment

Figure 1:
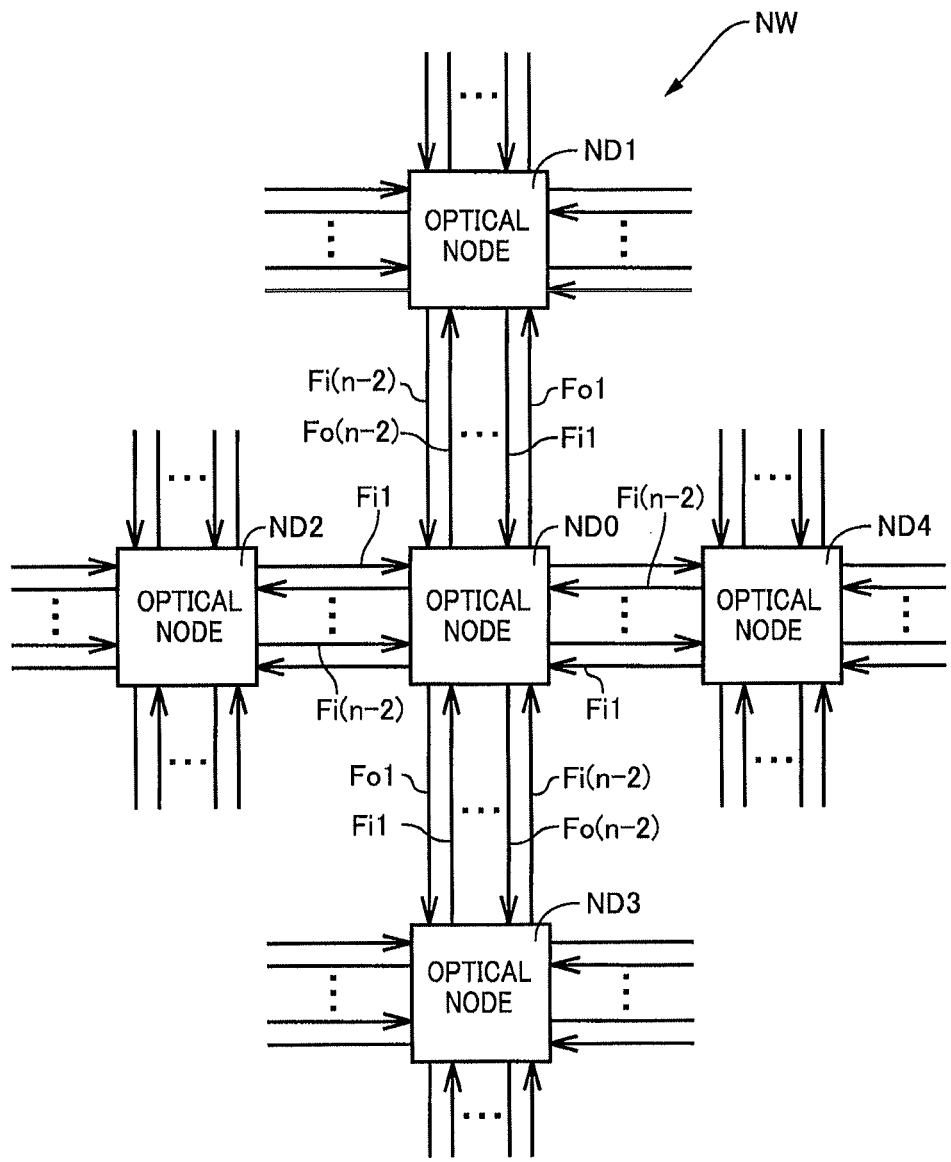
FIG. 1 is a conceptual diagram for explaining an example of an optical network in which optical nodes using optical cross-connect apparatuses of an embodiment of the present invention are connected through optical fibers.

FIG. 1 shows a portion of an optical network NW made up of multiple optical nodes ND0 to NDd and optical fibers F connecting the optical nodes. It is noted that d denotes an arbitrary positive integer and, although d is four indicative of the number of optical nodes adjacent to the optical node ND0 in this embodiment, d may be another integer.

The optical node ND0 is connected to each of the optical nodes ND1 to NDd through a set of (n−2) input optical fibers Fi1 to Fi(n−2) and a set of (n−2) output optical fibers Fo1 to Fo(n−2) each acting as a set of (n−2) internode connection fibers. Since all the optical nodes ND0 to ND4 are configured in the same way, the optical node ND0 will be described as a representative with reference to FIG. 2 and following figures.

Figure 2:
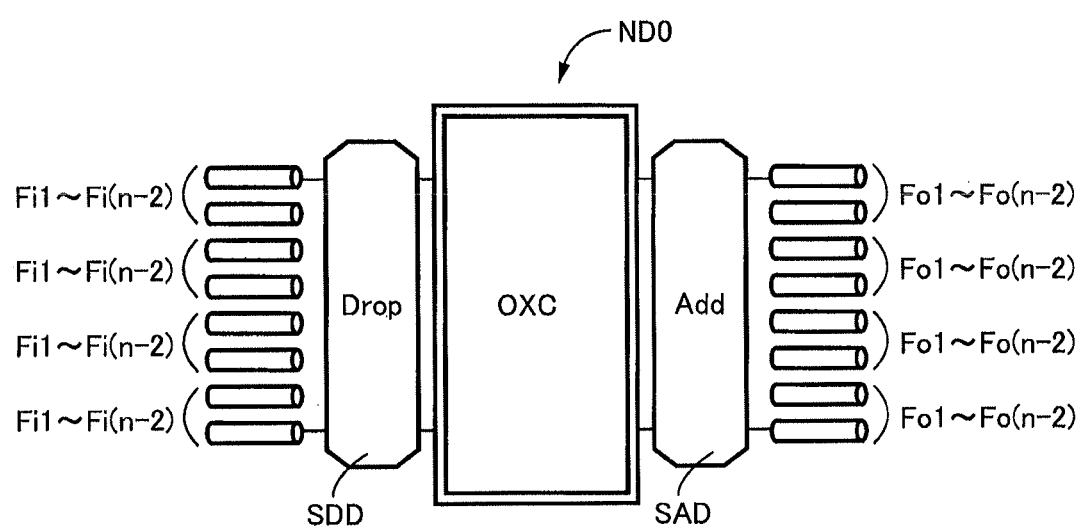
FIG. 2 is a schematic for explaining a configuration of the optical node in the optical network of FIG. 1.

As shown in FIG. 2, the optical node ND0 includes an optical cross-connect apparatus OXC routing (switching paths of) wavelength division multiplexing signals respectively transmitted through the input optical fibers Fi1 to Fi(n−2) from the optical nodes ND1 to ND4 located around the optical node ND0, on the basis of a wavelength or on the basis of a wave band, to send the signals to desired output optical fibers connected to any one of the optical nodes ND1 to ND4; an optical drop apparatus SDD positioned on the preceding stage of the optical cross-connect apparatus OXC and dropping a desired wavelength-based signal included in the wavelength division multiplexing signals respectively transmitted through the input optical fibers Fi1 to Fi(n−2) from the optical nodes ND1 to ND4 so that the signal is received by a transponder on an electric layer not shown; and an optical add apparatus SAD adding a predetermined wavelength-based signal sent from a transponder on the electric layer into an output optical fiber of a desired path connected to any one of the optical nodes ND1 to ND4. Although having the same configuration as each other, the optical drop apparatus SDD and the optical add apparatus SAD drop an optical signal of a desired wavelength and add an optical signal of a desired wavelength into an output optical fiber of a desired path when light is transmitted in directions opposite to each other. In this embodiment, the optical drop apparatus SDD and the optical add apparatus SAD make up an add-drop apparatus.

The input side of the optical cross-connect apparatus OXC is connected to (n−2) fibers from each of the optical nodes ND1 to NDd adjacent to the optical node ND0, i.e., a total of d*(n−2) fibers of d sets of the optical input fibers Fi1 to Fi(n−2). The arrangement of the input fibers is not limited to the order of FIG. 2 and is free. The output side of the optical cross-connect apparatus OXC is connected to (n−2) fibers toward each of the optical nodes ND1 to NDd adjacent to the optical node ND0, i.e., d sets of a total of 4*(n−2) fibers of the output optical fibers Fo1 to Fo(n−2). The arrangement of the output fibers is not limited to the order of FIG. 2 and is free. From the input optical fibers Fi1 to Fi(n−2), respective wavelength division multiplexing lights are transmitted and input to the optical cross-connect apparatus OXC. The wavelength division multiplexing lights having paths switched by the optical cross-connect apparatus OXC are respectively transmitted through the output optical fibers Fo1 to Fo(n−2) to the optical nodes ND1 to NDd. The d sets of the input optical fibers Fi1 to Fi(n−2) and the output optical fibers Fo1 to Fo(n−2) act as internode connection optical fibers. The input/output fibers may not be arranged based on the sets as in FIG. 2 and the fibers of each set may be arranged in a separated manner.

This embodiment includes the case that each wave band WB is formed by multiplexing lights of multiple wavelengths, e.g., 16 wavelengths, respectively corresponding to multiple wavelength channels (wave channels or light paths) divided by, for example, 100 GHz in a predetermined communication wavelength band; one wavelength division multiplexing (WDM) light is formed by multiplexing the wave bands WB; and the wavelength division multiplexing lights are transmitted through respective optical fibers in parallel. Therefore, the signals may be treated on the basis of a wave band instead of a wavelength. The wavelengths of the wavelength channels included in the wave bands WB of the wavelength division multiplexing light may sequentially continuously increase or may be dispersive. The wavelength division multiplexing light may be consisting of sequentially-arranged wave bands set as multiple wave bands sequentially selected such that each band is made up of 16 wavelengths continuous to each other selected out of continuous wavelength channels. Alternatively, the wavelength division multiplexing light may be consisting of dispersively-arranged wave bands having each wave band set as wavelengths dispersively selected from each of sets of multiple continuous wavelengths. The wavelength channels constituting the wavelength division multiplexing signals may be optical signals having the same bit rate as each other regardless of whether a wave band is used or not, or may be optical signals having bit rates partially or entirely different from each other. The wavelength channels may not necessarily be at equal intervals and may partially or entirely be wavelength channels at unequal intervals.

Figure 3:
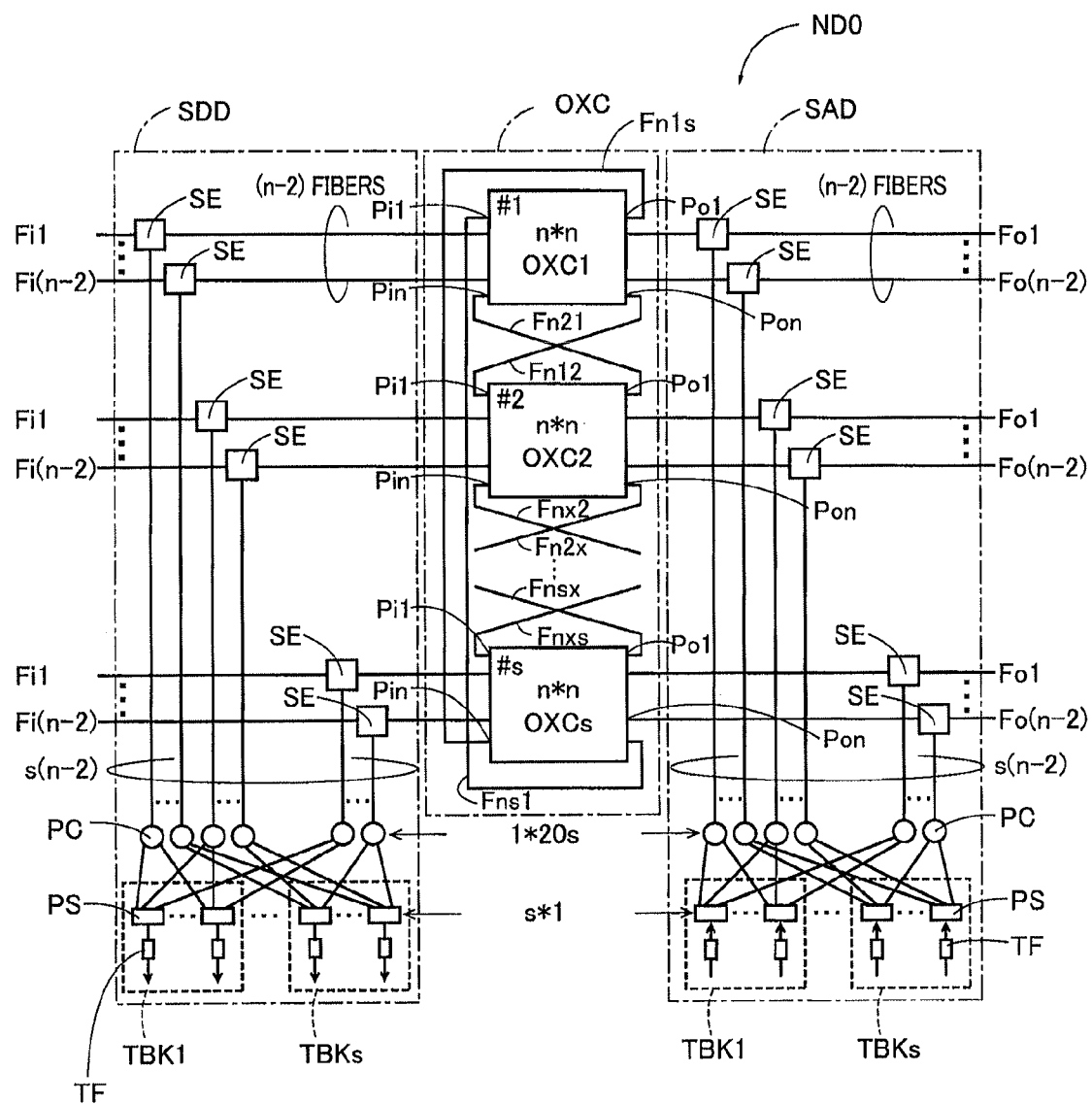
FIG. 3 is a diagram for more specifically explaining the configurations of the optical node of FIG. 2.

FIG. 3 shows configurations of the optical cross-connect apparatus OXC, the optical drop apparatus SDD, and the optical add apparatus SAD. In FIG. 3, the optical cross-connect apparatus OXC is made up of multiple optical cross-connect portions (sub-systems) OXC1 to OXCs (s is an integer indicative of the number). Because of d=4 in FIG. 1, the optical cross-connect apparatus OXC may include s optical cross-connect portions OXC1 to OXC4 in the same number as the number d of the other optical nodes ND1 to ND4 adjacent to the optical node ND0; however, the number s of the optical cross-connect portions OXC1 to OXCs may not be identical to the number d of the adjacent optical nodes ND1 to NDd and may be set independently of the number d of the other adjacent optical nodes ND1 to NDd.

In FIG. 3, the optical cross-connect portions OXC1 to OXCs have an n*m-input/output configuration; however, since n=m is frequently used in general, the optical cross-connect portions OXC1 to OXCs in this embodiment will be described as having an n*n-input/output configuration in which each optical cross-connect portion has n input ports Pi1 to Pin and n output ports Po1 to Pon.

Each of the optical cross-connect portions OXC1 to OXCs has the n input ports Pi1 to Pin and the n output ports Po1 to Pon except a pair of the input ports Pi1 and Pin and a pair of the output ports Po1 and Pon for internal connection, i.e., the input ports Pi2 to Pi(n−1) and the output ports Po2 to Po(n−1), respectively connected through a total of 4*(n−2) fibers of the d sets of the input optical fibers Fi1 to Fi(n−2) and a total of s*(n−2) fibers of the d sets of the output optical fibers Fo1 to Fo(n−2) to the output side and the input side of the optical nodes ND1 to NDd adjacent to the optical node ND0.

Out of the n input ports Pi1 to Pin and the n output ports Po1 to Pon of each of the optical cross-connect portions OXC1 to OXCs, a pair of the input ports Pi1 and Pin and a pair of the output ports Po1 and Pon are used as internal connection ports connected to the other adjacent optical cross-connect portions. For example, if a predetermined optical cross-connect portion is the optical cross-connect portion OXC1 in FIG. 3, the output port Po1 of the optical cross-connect portion OXC1 is directly connected through an internal connection optical fiber Fn1s to the input port Pin of another optical cross-connect portion OXCs adjacent to one side of the optical cross-connect portion OXC1, and is indirectly connected through said another optical cross-connect portion OXCs and an internal connection optical fiber Pnsx to the input port Pin of a further optical cross-connect portion OXCx not shown. The output port Pon of the optical cross-connect portion OXC1 is directly connected through an internal connection optical fiber Fn1s to the input port Pi1 of another optical cross-connect portion OXC2 adjacent to the other side of the optical cross-connect portion OXC1, and is indirectly connected through said another optical cross-connect portion OXC2 and an internal connection optical fiber Fn2x to the input port Pi1 of a further optical cross-connect portion OXCx not shown. Therefore, the optical cross-connect portions OXC1 to OXCs are connected such that an output port of a predetermined optical cross-connect portion is directly internally connected to an input port of another optical cross-connect portion adjacent thereto and is indirectly internally connected via said another adjacent optical cross-connect portion to an input port of a further optical cross-connect portion. As a result of such connection, the optical cross-connect portions OXC1 to OXCs are arranged like a ring and bi-directionally internally connected. The internal connection of each of the optical cross-connect portions may not necessarily be configured as a ring as shown in FIG. 3, and OXC1 and OXCs may not directly be connected in the case of FIG. 3. Although the optical cross-connect portions are connected through multiple (two) fibers in FIG. 3, the optical cross-connect portions may be connected through one fiber.

In the optical cross-connect apparatus OXC having the optical cross-connect portions OXC1 to OXCs interconnected through the internal connection optical fibers in this way, a wavelength output from a predetermined optical cross-connect portion of the optical cross-connect portions OXC1 to OXCs is also input to any other optical cross-connect portions and, therefore, a path of a wave band or a wavelength input from any fiber of s groups of the input optical fibers Fi1 to Fi(n−2) can be switched to any fiber of s groups of the output optical fibers Fo1 to Fo(n−2). In the case of using a plurality of the small-scale optical cross-connect portions OXC1 to OXCs having the input terminals smaller in number as compared to the number (n−2) of fibers in one group of the input optical fibers Fi1 to Fi(n−2), a predetermined wavelength output from any one of the optical cross-connect portions OXC1 to OXCs can be input to the other optical cross-connect portions to cause the predetermined wavelength to go and return so that the routing can repeatedly be performed in the optical cross-connect portions to switch the path of the predetermined wavelength.

Figure 4:
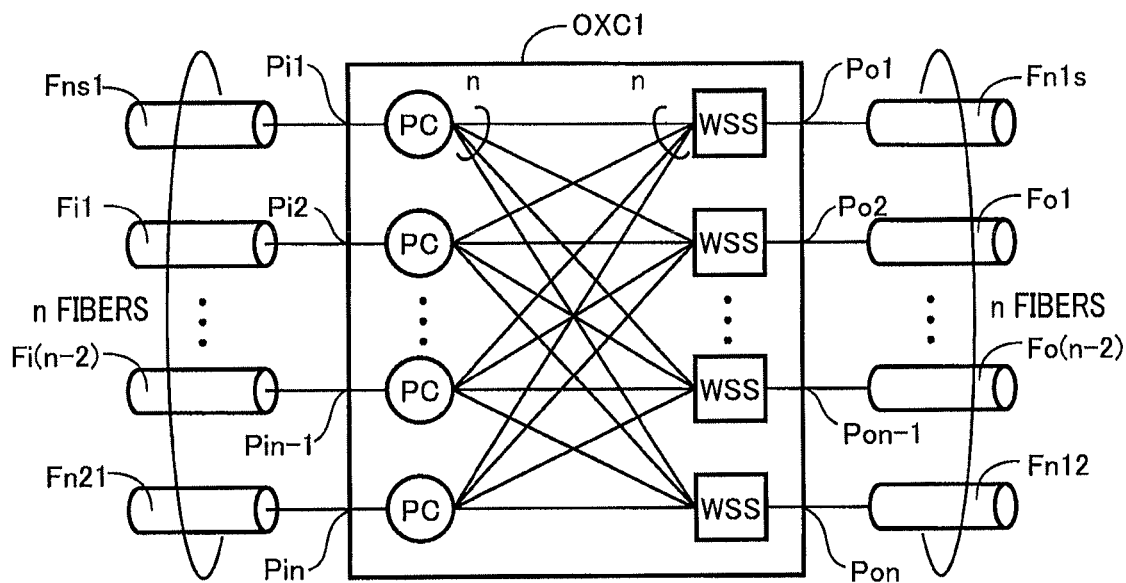
FIG. 4 is a diagram for explaining a configuration of a main portion of one of multiple optical cross-connect portions making up the optical cross-connect apparatus of FIG. 3.

Since the optical cross-connect portions OXC1 to OXCs have substantially the same configuration as shown in FIG. 4 in that n 1*n-photocouplers PC and n n*1-wavelength selective switches WSS are included, an example of the configuration will hereinafter be described in detail with reference to FIG. 4 by using the optical cross-connect portion OXC1 as a representative.

In FIG. 4, the photocouplers PC of the optical cross-connect portion OXC1 are well-known photocouplers such as branch couplers formed by branching optical fibers or waveguides. The photocouplers PC branch, distribute, and input respective wavelength division multiplexing lights, wave bands, or wavelengths input from the input optical fibers Fi1 to Fin, directly to the n wavelength selective switches WSS. The wavelength selective switches WSS select and alternatively output predetermined wavelengths from the wavelength division multiplexing lights, wave bands, or wavelengths distributed from the photocouplers PC, to the respective output optical fibers Fo1 to Fon (=Po4).

Figure 5:
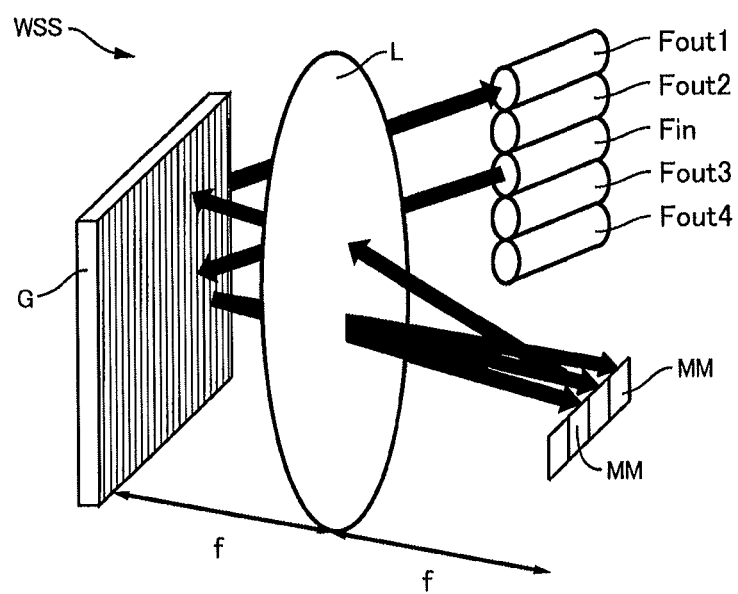
FIG. 5 is a schematic for explaining multiple wavelength selective switches WSS used in the optical cross-connect portion of FIG. 4 by using a configuration example using MEMS.
Figure 6:
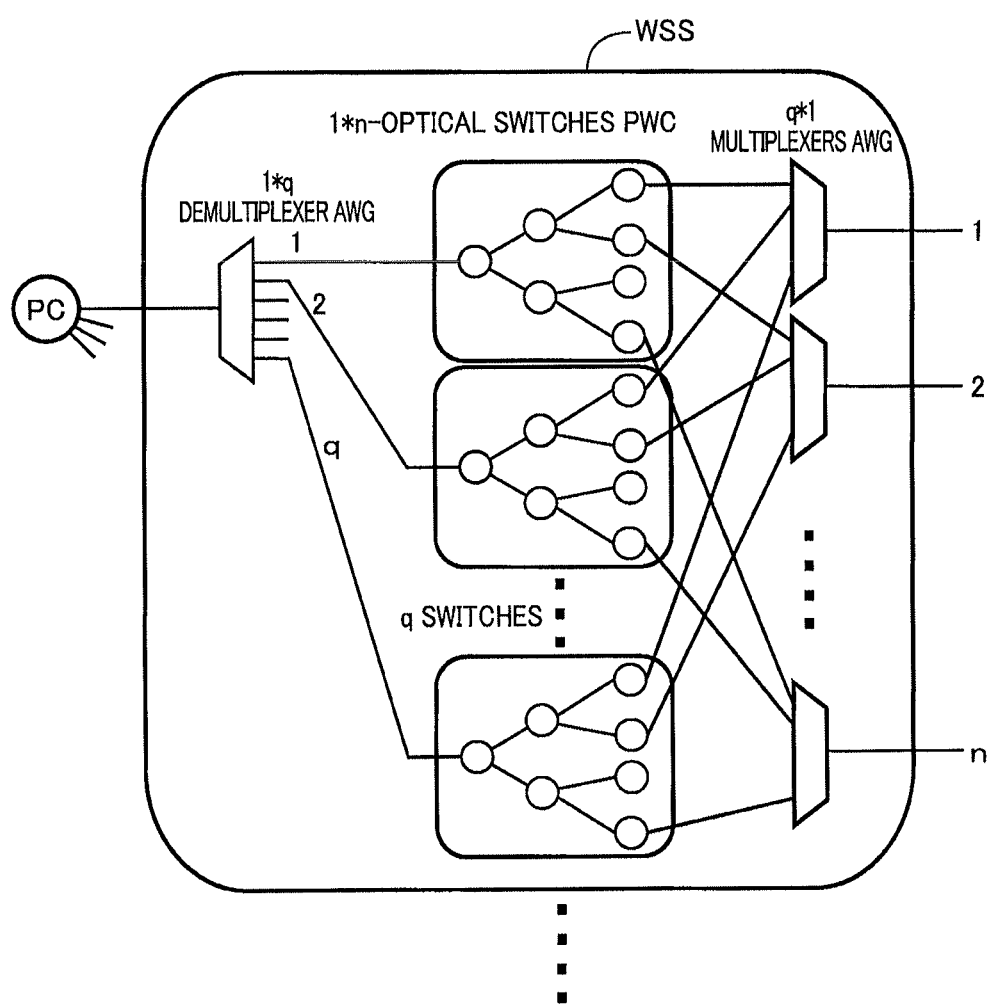
FIG. 6 is a schematic for explaining multiple wavelength selective switches WSS used in the optical cross-connect portion of FIG. 4 by using a configuration example using a demultiplexer, optical switches, and multiplexers (wave combiners).

Each of the wavelength selective switches WSS is made up of, for example, a three-dimensional MEMS optical switch shown in a schematic of FIG. 6 or a planer wavelength selective switch shown in FIG. 5. In FIG. 5, a three-dimensional MEMS optical switch is described in 1*4 or 4*1 scale by using one input optical fiber Fin and four output optical fibers Fout1 to Fout4 connected to the photocoupler PC, for example. This three-dimensional MEMS optical switch includes a spectral grating (diffraction grating) G that is a spectral element dispersing the wavelength division multiplexing light input from the input optical fiber Fin on the basis of a wavelength, m (the number of wavelengths, simplified to four in FIG. 5) micromirrors MM subjected to the position control by an actuator not shown, and a condensing lens L disposed between the spectral grating and the micromirrors to condense a dispersed wavelength onto one of the micromirrors MM, and is driven such that a wavelength division multiplexing light or a wave band input from the input optical fiber Fin is dispersed by the spectral grating G on the basis of a wavelength and is then condensed by the condensing lens L onto the micromirrors MM for respective wavelengths and that a reflected light from the micromirrors MM is incident on a desired one of the output fibers Fout1 to Fout4, so as to provide a wavelength selective switch function. Such a three-dimensional MEMS optical switch may practically be configured up to about 1*9 scale.

The wavelength selective switch WSS shown in FIG. 6 may be configured as a planer type by integrating waveguides and elements on a common semiconductor or quartz substrate with a planar lightwave circuit (PLC) technique, for example. This planer type wavelength selective switch WSS may be made up of, for example, one 1*q-(q is the number of wavelengths per fiber) demultiplexer (arrayed-waveguide grating) AWG connected to an optical fiber from a photocoupler PC and demultiplexing the wavelength division multiplexing light input therefrom into each wavelength, q 1*n-optical switches PWC switching a path for each of the wavelengths demultiplexed by the 1*q demultiplexer AWG, and q*1-multiplexers (arrayed-waveguide gratings) AWG each receiving and multiplexing the output wavelengths from the 1*n-optical switches PWC for outputting to n output ports Po1, Po2, . . . Pon.

Returning to FIG. 3, the optical drop apparatus SDD includes s*(n−2) optical branch elements SE consisting of 1*2-photocouplers or 1*2-wavelength selective switches respectively disposed on (n−2) optical fibers from each of the optical nodes ND1 to NDd adjacent to the optical node ND0, i.e., a total of s*(n−2) input optical fibers Fi1 to Fi(n−2) so as to branch transmitted light; s*(n−2) 1*20s-photocouplers PC branching respective optical signals branched by the optical branch elements SE; and (n−2) transponder banks TBK1 to TBKs connected to respective multiple groups, i.e., (n−2) groups of 1*20s-photocouplers PC formed out of the s*(n−2) 1*20s-photocouplers PC in the order of the (n−2) input optical fibers Fi1 to Fi(n−2) input to each of the optical cross-connect portions OXC1 to OXCs. These transponder banks TBK1 to TBKs act as drop signal receiving apparatuses. Each of the transponder banks TBK1 to TBKs includes 20s s*1-optical switches PS receiving signals from all the s 1*20s-photocouplers PC making up each of the (n−2) groups; and 20s tunable wavelength filters (tunable filters) TF acing as wavelength selective elements respectively extracting a desired wavelength from the output lights of the 20s s*1-optical switches PS. An optical signal (drop signal) of a predetermined wavelength output from the tunable wavelength filters TF is dropped to a predetermined router on the electric layer not shown and is converted into an electric signal by a photoreceiver. In the case of coherent reception, the tunable wavelength filters TF are not necessarily required and the photoreceiver may be given a wavelength filter function.

The s*1-optical switches PS are switches selecting a single fiber from which a signal is dropped out of the (n−2) input optical fibers Fi1 to Fi(n−2) input to each of the optical cross-connect portions OXC1 to OXCs and are divided into (n−2) groups. Since the s*1-optical switches PS are divided into the (n−2) groups (sets) and signals limited by a predetermined drop rate are dropped thereto, the photocouplers PC and the optical switches PS are consequently reduced in scale as described later. The 20s reflects the drop rate.

The 1*2-optical branch elements SE, the 1*20s-photocouplers PC, the s*1-optical switches PS, and the tunable wavelength filters (tunable filters) TF making up the optical drop apparatus SDD have optical reversibility in which an optical path is established not only in a forward direction described above but also in a backward direction, the optical add apparatus SAD is made up of optical components connected in the same way as the optical drop apparatus SDD as shown in FIG. 3. As a result, an add signal converted from an electric signal into an optical signal in the electric layer not shown is added as a wavelength-based add signal in the reversed route of the optical drop apparatus SDD to the output optical fiber in the desired path out of the output optical fibers Fo1 to Fo(n−2) and added to the wavelength division multiplexing light of the desired path. The transponder banks TBK1 to TBKs of the optical add apparatus SAD act as add signal sending apparatuses.

Figure 7:
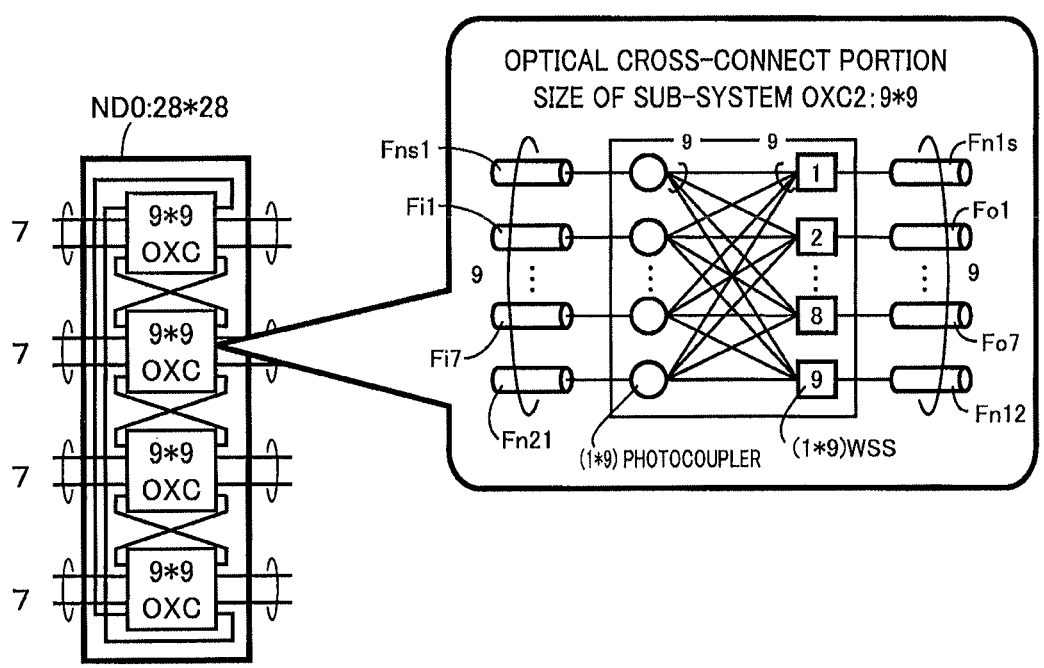
FIG. 7 is a diagram for explaining a configuration scale of the multiple optical cross-connect portions making up the optical cross-connect apparatus of FIG. 3 in comparison with the apparatus consisting of one conventional large-scale wavelength selective switch WSS shown in FIG. 8.

FIG. 7 shows the optical node ND0 and the optical cross-connect apparatus OXC included therein, and an optical cross-connect portion OXC2 representative of the configuration of optical cross-connect portions OXC1 to OXC4 making up the optical cross-connect apparatus OXC, when the total number of input or output fibers is 28 for each of the optical nodes ND0 to ND4. In this case, because of m=n=7, both the number of the input optical fibers Fi1 to Fi(n−2) and the number of the output optical fibers Fo1 to Fo(n−2) are seven and, since the two internal connection optical fibers Fns1 and Fn21 are connected to the input side and the two internal connection optical fibers Fn1s and Fn12 are connected to the output side, the optical cross-connect portion OXC2 has the scale of 9*9. As a result, the optical cross-connect portion OXC2 is made up of nine 1*9-photocouplers PC and nine 1*9-wavelength selective switches WSS. Therefore, the optical cross-connect apparatus OXC is made up of 36 1*9-photocouplers PC and 36 1*9-wavelength selective switches WSS as a whole. Thus, the optical cross-connect apparatus OXC in this embodiment has the number of required 1*9-wavelength selective switches WSS reduced to about ⅓ as compared to a conventional optical cross-connect apparatus OXC consisting of one large-scale wavelength selective switch WSS as shown in FIG. 8.

Figure 8:
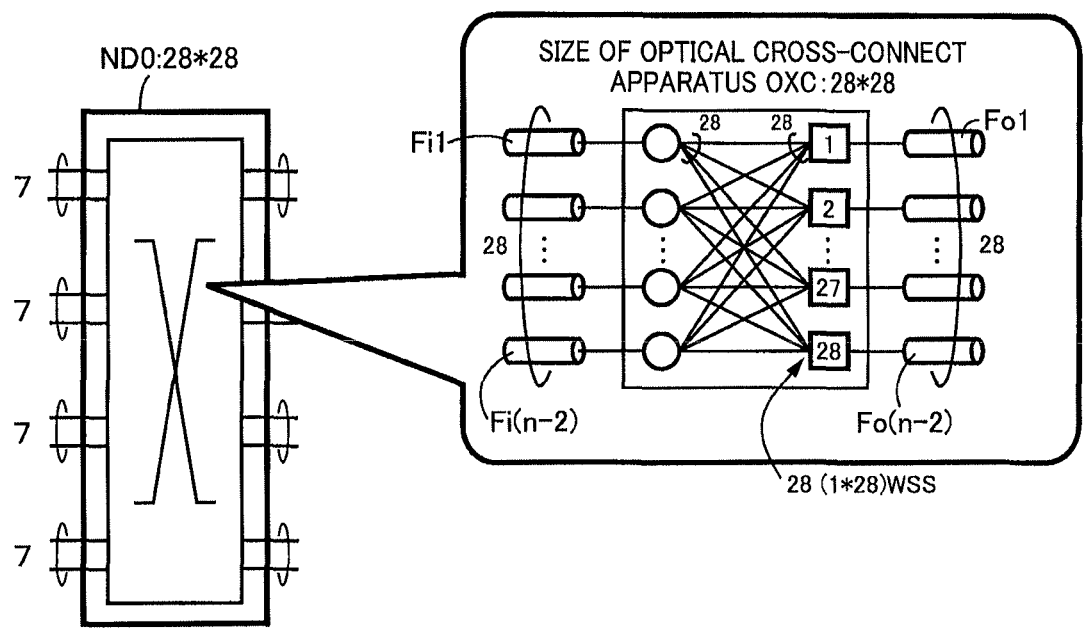
FIG. 8 is a diagram for explaining a configuration of a conventional optical cross-connect apparatus consisting of one large-scale wavelength selective switch WSS.
Figure 9:
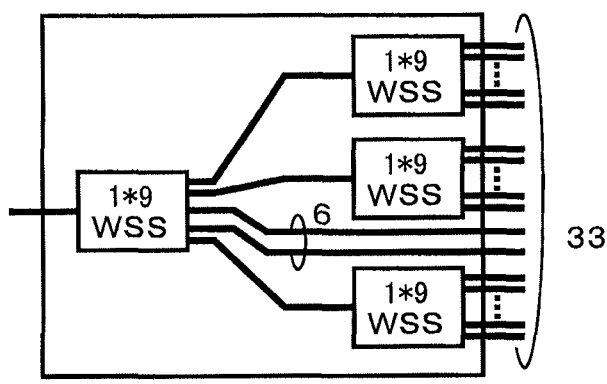
FIG. 9 is a diagram of an example of a configuration using four 1*9-wavelength selective switches WSS when it is assumed that a 1*28-wavelength selective switch WSS is realistically made up of the smallest number of switches so as to realistically construct the conventional optical cross-connect apparatus shown in FIG. 8.

In contrast, in the conventional case that the optical cross-connect apparatus OXC included in the optical node ND0 is made up of a single optical cross-connect portion in the same optical network NW, since no interconnection is made and the scale of the optical cross-connect portion is 28*28 as shown in FIG. 8, the optical cross-connect apparatus OXC is made up of 28 1*28-photocouplers PC and 28 1*28-wavelength selective switches WSS. Since the scale of the 1*28-wavelength selective switches WSS is unrealistic as described above, if it is attempted to achieve a realistic configuration with the number reduced as small as possible, the 1*28-wavelength selective switch WSS is configured by using four 1*9 wavelength selective switches WSS as shown in FIG. 9, for example. Although the scale in this case is 1*33, the wavelength selective switch WSS can be used in the 1*28 scale by using the necessary ports. The optical cross-connect apparatus OXC with such a conventional configuration requires (4*28=112) 1*9-wavelength selective switches WSS.

Figure 10:
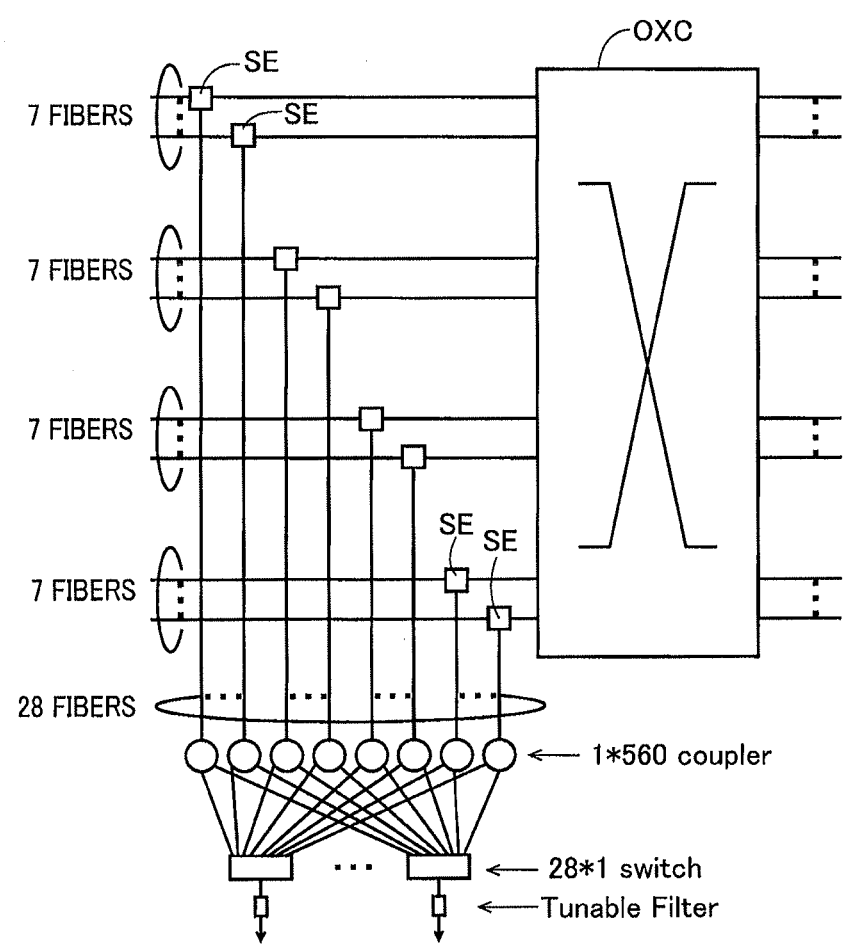
FIG. 10 is a diagram of a configuration example of an optical add-drop apparatus disposed at a node having the conventional optical cross-connect apparatus shown in FIG. 9 when a 40-wavelength multiplexing signal is input from each optical fiber of four sets of seven input optical fibers.
Figure 11:
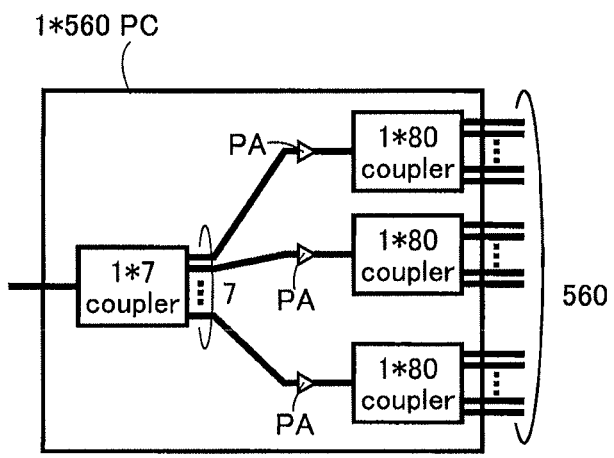
FIG. 11 is a diagram for explaining an example of a 1*560-photocoupler PC of FIG. 10 in a realistic three-stage configuration made up of one 1*7-photocoupler PC on a first stage, seven optical amplifiers PA on a second stage, and seven 1*80-photocouplers PC on a third stage.
Figure 12:
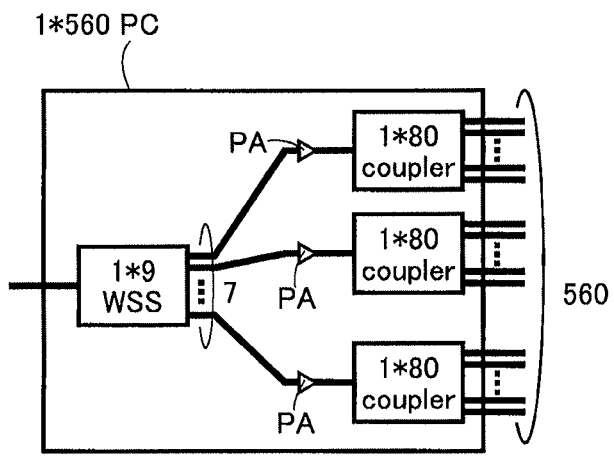
FIG. 12 is a diagram for explaining another example of a 1*560-photocoupler PC of FIG. 10 in a realistic three-stage configuration made up of one 1*9-wavelength selective switches WSS on a first stage, seven optical amplifiers PA on a second stage, and seven 1*80-photocouplers PC on a third stage.

FIG. 10 shows a conventional optical drop apparatus SDD in the case that the optical cross-connect apparatus included in the optical node ND0 is made up of a single large-scale optical cross-connect portion when it is assumed that seven input optical fibers Fi1 to Fi(n−2) and seven output optical fibers Fo1 to Fo(n−2) are connected to each of the optical nodes ND1 to ND4 adjacent to the optical node ND0, that multiplexing signals include 40 wavelengths per fiber, and that an add-drop rate is 50%. The optical drop apparatus SDD in this case drops signals from the input optical fibers to all the transponders and is made up of 28 1*560-photocouplers PC, 560 28*1-optical switches PS, and 560 tunable wavelength filters TF. The numbers of the 28*1-optical switches PS and the 560 tunable wavelength filters TF are derived from the number of multiplexed wavelengths*the add-drop rate*the number of fibers. The 1*560-photocouplers PC have an unrealistic scale due to a large loss and is therefore configured with a three-staged cascade connection as shown in FIG. 11 or 12, for example. A 1*560-photocoupler shown in FIG. 11 is made up of one 1*7 photocoupler on a first stage, optical amplifiers PA on a second stage, and seven 1*80-photocouplers on a third stage. A 1*560-photocoupler shown in FIG. 12 is configured in the same way except that the first stage is made up of one 1*9 wavelength selective switches WSS. Because of a large loss of the 1*80-photocouplers on the third stage, the optical amplifiers PA on the second stage have a gain at the level compensating the loss, for example, the gain of 20 dB. For example, the 28 1*560-photocouplers in the case shown in FIG. 11 are made up of 196 1*80-photocouplers, 28 1*7-photocouplers and 196 optical amplifiers PA. The optical amplifiers PA are made up of, for example, erbium doped optical fiber amplifiers (EDFA) having a gain of about 20 dB corresponding to the attenuation of the 1*80-photocouplers.

Figure 13:
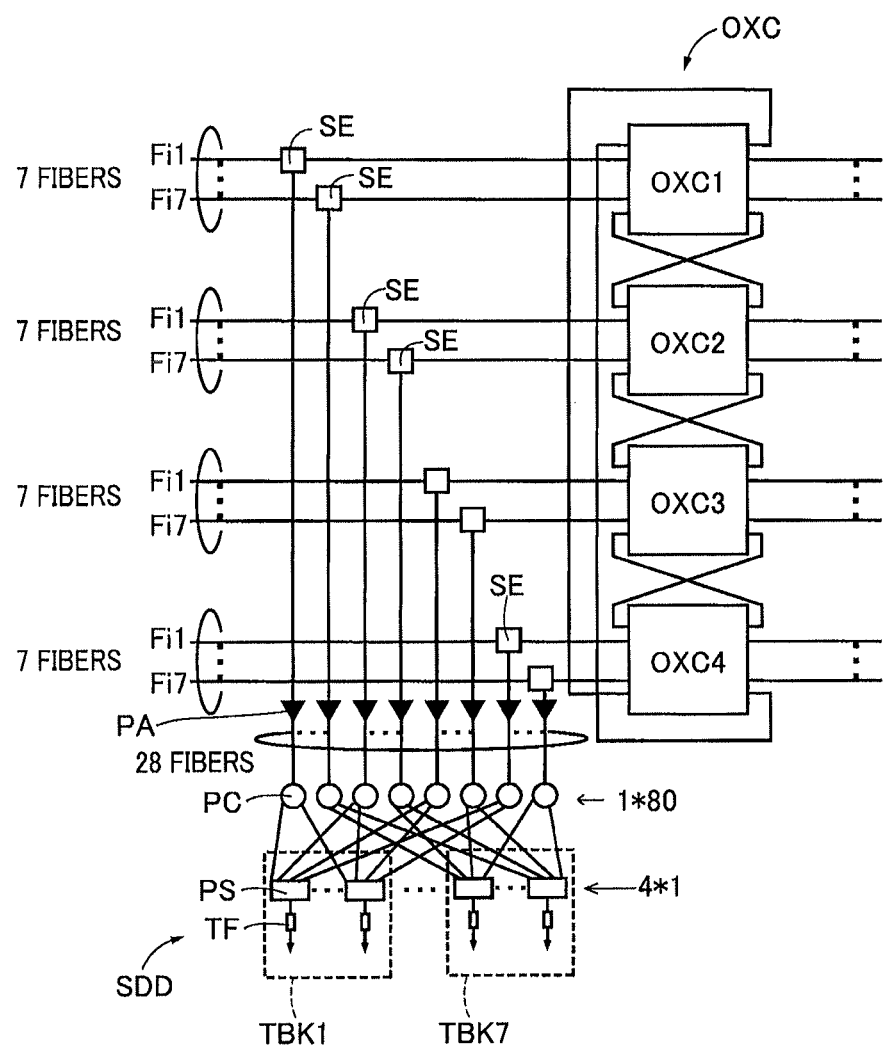
FIG. 13 is a diagram of a configuration example of the optical add-drop apparatus shown in FIG. 3 when a 40-wavelength multiplexing signal is input from each optical fiber of four sets of seven input optical fibers as is the case with FIG. 10.

On the other hand, in the optical drop apparatus SDD of this embodiment to which the same conditions as above are applied, the fibers connectable to the transponder banks are limited for each of the optical cross-connect portions (sub-systems), and a signal from none, one, or a plurality of fibers of each of the optical cross-connect portions (sub-systems) can be dropped to the transponder banks. FIG. 13 shows an example in which a signal can be dropped from one fiber of each of the optical cross-connect portions (sub-systems) to each of the transponder banks TBK1 to TBK7. In particular, the optical cross-connect apparatus OXC is made up of four (s) optical cross-connect portions OXC1 to OXC4. The optical drop apparatus SDD is made up of 28 1*80-photocouplers PC, 28 optical amplifiers PA disposed on the preceding stage of the 28 1*80-photocouplers PC, and 560 in total 4*1-optical switches PS forming seven groups such that each of seven transponder banks TBK1 to TBK7 is made up of 80 optical switches PS, and 560 tunable wavelength filters TF. As is clear from the above, the optical drop apparatus SDD of this embodiment reduces both the numbers of the 1*80-photocouplers PC and the optical amplifiers PA to ⅐, eliminates the need for the 28 1*8-photocouplers PC, and reduces the scale of the 560 optical switches PS from 28*1 to 4*1, thereby significantly reduces the overall scale.

Figure 14:
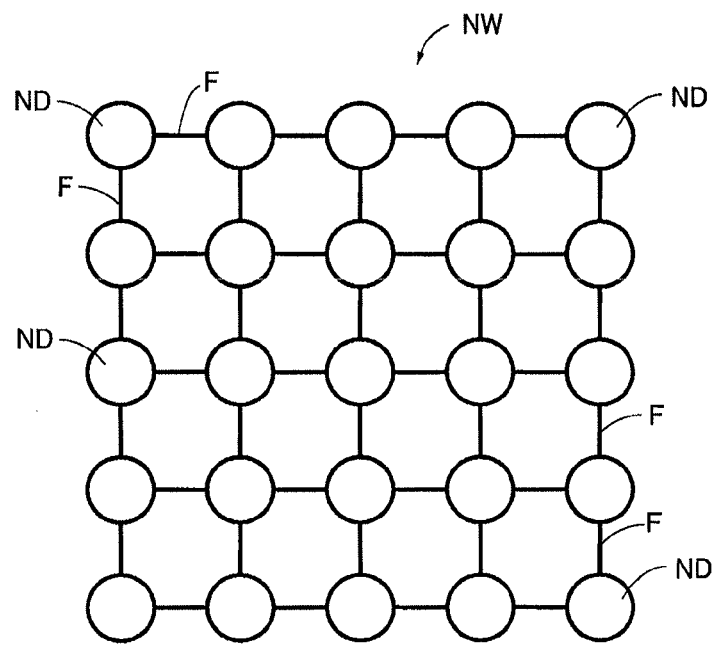
FIG. 14 is a diagram for explaining a logical configuration of an optical network used in a simulation conducted by the present inventors.
Figure 15:
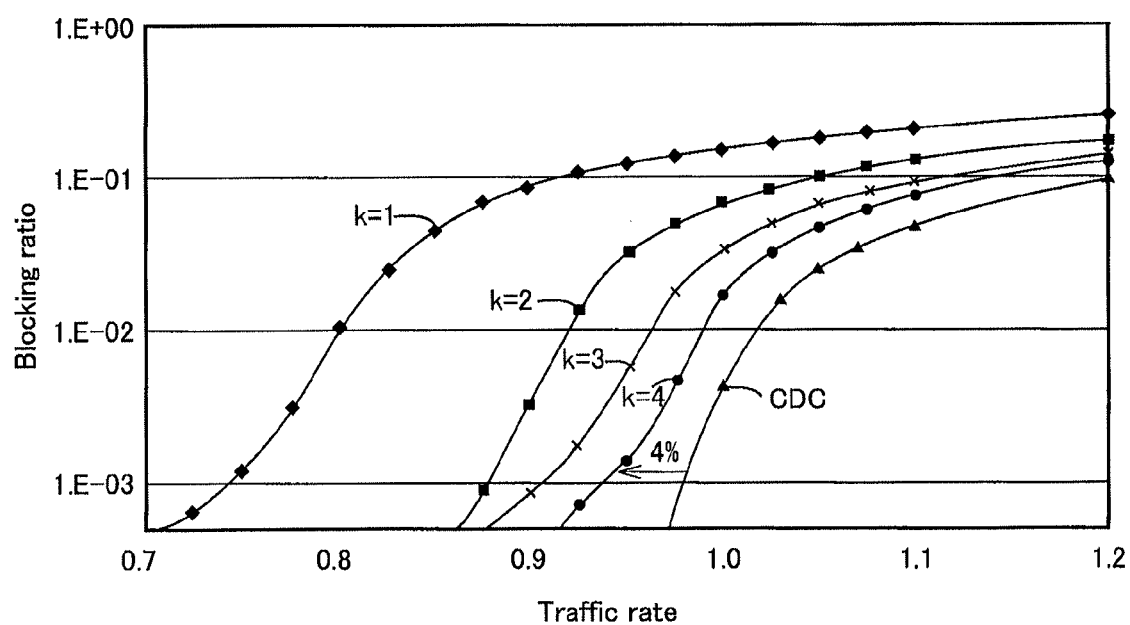
FIG. 15 is a diagram of a simulation result for the logical configuration topology of FIG. 9 in two-dimensional coordinates with the horizontal axis indicative of a rate of normalized traffic and the vertical axis indicative of a blocking ratio (probability) in terms of a relation between the traffic rate and the blocking ratio by using the number k of fibers connected from sub-systems to the same transponder bank as a parameter.

In a 5*5-square grid network NW having 25 optical nodes ND interconnected into a square shape by a plurality of optical fibers F as shown in FIG. 14, the inventors obtained a relation between a blocking ratio (rate) and a traffic rate by using the number k of fibers connected from subsystems to the same transponder bank as a parameter under the following simulation conditions when the optical cross-connect apparatus OXC and the optical drop apparatus SDD of each of the optical nodes ND were the optical cross-connect apparatus OXC including the multiple interconnected optical cross-connect portions and the optical drop apparatus SDD having the transponder banks each disposed with multiple groups of optical switches PS selecting a plurality of input optical fibers input to each of the optical cross-connect portions (configuration of the present invention) as shown in FIGS. 3 and 13, for example. FIG. 15 shows the calculation results.

(Simulation Conditions)
 Topology: 5*5 square grid network (FIG. 14)
 Multiplexing light per fiber: multiplexing light of 80 wavelengths
 Maximum size of one optical cross-connect portion: 9*9
 Traffic: internode average path demand=14
traffic distribution=uniformly random
occurrence of demand=Poisson distribution In FIG. 15, CDC represents a configuration dropping signals from all the input optical fibers to all the transponders without using a transponder bank as shown in FIG. 13. As is apparent from FIG. 15, as the number k of fibers connected from the subsystems to the same transponder bank becomes smaller, the traffic rate at the blocking rate of 1.E-0.3 is more reduced. At k=4, k=3, k=2, and k=1, the traffic rate is reduced by 4%, 10%, 13%, and 26%, respectively. Even the case of k=1 may practically be used depending on the purpose.

Figure 16:
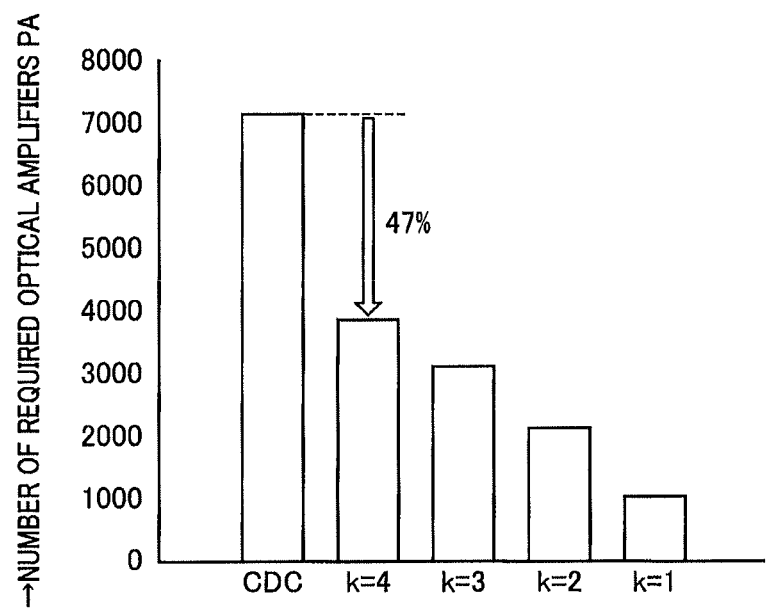
FIG. 16 is a diagram of a relation between the number of required optical amplifiers PA for the 1*560 photocouplers PC configured in multiple stages shown in FIG. 11 or 12, for example, and the number k of fibers connected from the subsystems to the same transponder bank in comparison with the conventional type of FIG. 10

FIG. 16 shows a relation between the number of required optical amplifiers PA for the 1*560 photocouplers PC configured in multiple stages shown in FIG. 11 or 12, for example, and the number k of fibers connected from the subsystems to the same transponder bank in comparison with the conventional type of FIG. 10 when the optical cross-connect apparatus OXC includes the multiple interconnected optical cross-connect portions and the optical drop apparatus SDD has the transponder banks each disposed with multiple groups of optical switches PS selecting a plurality of input optical fibers input to each of the optical cross-connect portions (configuration of the present invention) as shown in FIGS. 3 and 13, for example. According to this relation, the 47% reduction effect is acquired even at k=4.

The effect of the optical drop apparatus SDD is also acquired from the optical add apparatus SAD configured in the same way.

As described above, the optical add-drop apparatus, i.e., the optical drop apparatus SDD of this embodiment includes a plurality of the 1*20s-photocouplers PC connected to a part of or all of the input optical fibers Fi1 to Fi(n−2) of each of the s groups respectively connected to the multiple optical cross-connect portions OXC1 to OXCs; and a plurality of the transponder banks (drop signal receiving apparatuses) TBK that each include a group of the s*1-optical switches PS each receiving and alternatively selecting a signal output from a group of photocouplers PC connected to respective different optical cross-connect portions of the multiple optical cross-connect portions OXC1 to OXCs out of the plurality of the photocouplers PC and a plurality of the tunable wavelength filters TF each selecting and supplying a signal of a desired wavelength to a transponder not shown for each of signals respectively output from the group of the optical switches PS and, therefore, as compared to a conventional optical drop apparatus that includes multiple-stage photocouplers whose number is several times larger than the number of input optical fibers because of a multiple-stage configuration for extracting an arbitrary wavelength out of the wavelengths transmitted through each of the input optical fibers Fi1 to Fi(n−2) and optical switches selecting the light from the multiple-stage photocouplers whose number is acquired by multiplying the number of all the waves (=the number of fibers*the number of multiplexed wavelengths per fiber) by a drop rate so as to selectively extract a light of a predetermined wavelength from the output lights from the optical switches, the number of the photocouplers PC is made smaller and the scale of the optical switches PS is significantly reduced, so that the scale of the optical add-drop apparatus can significantly be reduced.

The optical add-drop apparatus, i.e., the optical add apparatus SAD of this embodiment includes a plurality of the photocouplers PC connected to a part of or all of the output optical fibers Fo1 to Fo(n−2) of each of the s groups respectively connected to the multiple optical cross-connect portions OXC1 to OXCs; and a plurality of the transponder banks (add signal sending apparatuses) TBK1 to TBKs that include multiple groups of the s*1-optical switches PS outputting a signal of a desired wavelength to any one of photocouplers in a group of photocouplers PC connected to respective different optical cross-connect portions of the multiple optical cross-connect portions out of the plurality of the photocouplers PC and multiple groups of the tunable wavelength filters TF disposed respectively for the s*1-optical switches PS and extracting a desired wavelength from lights output from transponders not shown to output respective add signals to the s*1-optical switches PS and, therefore, as compared to a conventional optical add apparatus that includes multiple-stage photocouplers whose number is several times larger than the number of output optical fibers because of a multiple-stage configuration for adding an arbitrary wavelength into a desired output optical fiber and optical switches selecting and outputting a desired optical signal to the multiple-stage photocouplers whose number is acquired by multiplying the number of all the waves (=the number of fibers*the number of multiplexed wavelengths per fiber) by a drop rate so as to selectively output a light of a predetermined wavelength from the output lights from the optical switches to a desired output optical fiber, the number of the photocouplers PC is made smaller and the scale of the optical switches PS is significantly reduced, so that the scale of the optical add-drop apparatus can significantly be reduced.

The optical cross-connect apparatus OXC disposed with the optical add-drop apparatus of this embodiment includes the multiple optical cross-connect portions (sub-systems) OXC1 to OXCs each having internode connection input ports Pi2 to Pi(n−1) and the internode connection output ports Po2 to Po(n−1) respectively connected to multiple internode connection optical fibers as well as the internal connection input ports Pi1, Pin and the internal connection output ports Po1, Pon and, since each of the multiple optical cross-connect portions OXC1 to OXCs is connected such that an internal connection output port of a predetermined optical cross-connect portion is directly connected to an internal connection input port of another optical cross-connect portion and is indirectly connected via said another optical cross-connect portion to an internal connection input port of a further optical cross-connect portion, the routing can mutually be performed among the optical cross-connect portions OXC1 to OXCs and, therefore, as compared to a conventional optical cross-connect apparatus having the same blocking rate at the same number of fibers, the scale of hardware such as the optical cross-connect portions or the wavelength selective switches can significantly be reduced while a path accommodation capacity is maintained at the same level. Additionally, since a wavelength can be transmitted from a predetermined optical cross-connect portion bi-directionally to a pair of one and the other optical cross-connect portions adjacent thereto in the optical cross-connect apparatus OXC, the optical cross-connect apparatus OXC is advantageous in that a path switching process time can be shortened as compared to the case of transmitting a wavelength in one direction.

According to the present embodiment, since the number (n−2) of the multiple groups of the optical switches PS of the optical drop apparatus SDD is equal to the number (n−2) of the input optical fibers Fi1 to Fi(n−2) input to each of the optical cross-connect portions OXC1 to OXCs or the number (n−2) of the output optical fibers Fo1 to Fo(n−2) output from the optical cross-connect portions OXC1 to OXCs, the number of the photocouplers PC is preferably made smaller and the scale is reduced.

In the optical drop apparatus SDD, the drop of optical signals may be limited for each of the groups of input optical fibers respectively input to the multiple optical cross-connect portions OXC1 to OXCs among the multiple groups (s groups) of the input optical fibers Fi1 to Fi(n−2), i.e., for each of the optical cross-connect portions OXC1 to OXCs. In the optical add apparatus SAD, the addition (add) of optical signals may be limited for each of the groups of output optical fibers respectively output from the multiple optical cross-connect portions OXC1 to OXCs out of the multiple groups (s groups) of the output optical fibers Fo1 to Fo(n−2), i.e., for each of the optical cross-connect portions OXC1 to OXCs. Since the predetermined drop-limited group of the input optical fibers Fi1 to Fi(n−2) or the predetermined add-limited group of the output optical fibers Fo1 to Fo(n−2) is not disposed with an optical branch element SE such as a photocoupler or a 1*2-wavelength selective switch branching a light to a photocoupler PC or adding a light from the photocoupler as well as the photocoupler PC connected thereto in accordance with a predetermined drop rate or add rate, the number of the optical branch elements SE and the photocouplers PC can be made smaller. The limitation for each of the optical cross-connect portions OXC1 to OXCs is convenient for the routing.

Figure 17:
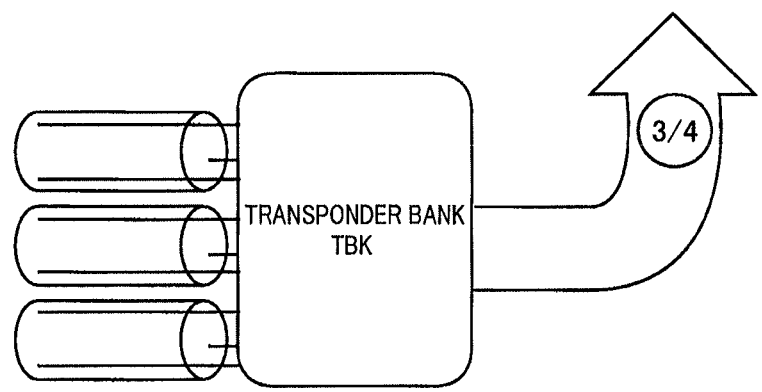
FIG. 17 is a schematic for explaining that the number of wavelengths is limited for each of the transponder banks in accordance with an add-drop rate determined in advance.

As conceptually shown in FIG. 17, in the optical drop apparatus SDD, the number of droppable wavelengths may be limited for each of the multiple transponder banks TBK in accordance with an add-drop rate determined in advance on the basis of a wavelength signal input thereto. In the optical add apparatus SAD, the number of addable wavelengths may be limited for each of the multiple transponder banks TBK in accordance with an add-drop rate determined in advance from a wavelength signal output therefrom. This limitation for each of the transponder banks TBK is convenient for design. Determining an overall add-drop rate is disadvantageous in terms of design since the numbers of added and dropped wavelengths are different in each of the transponder banks TBK. FIG. 17 shows the case of the add-drop rate of ¾.

Figure 18:
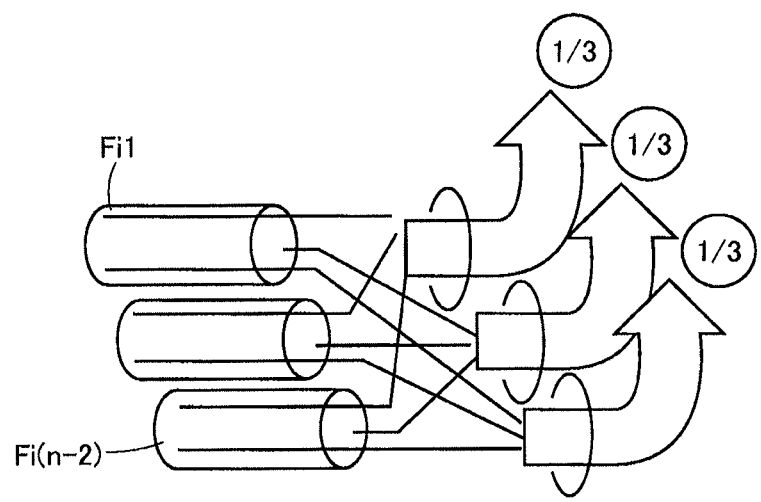
FIG. 18 is a schematic for explaining that the number of wavelengths is limited in accordance with an add-drop rate determined in advance on the basis of the input optical fibers.

As conceptually shown in FIG. 18, in the optical drop apparatus SDD, the total number of droppable wavelengths may be limited in accordance with a drop rate determined in advance on the basis of a plurality of the input optical fibers Fi1 to Fi(n−2). In the optical add apparatus SAD, the total number of addable wavelengths is limited in accordance with an add rate determined in advance on the basis of a plurality of the output optical fibers. In this case, the limitation by the predetermined drop and add rates can easily be set for each of the multiple groups of the optical switches. If it is attempted to put limitations by the predetermined drop and add rates on the entire node, a wasteful configuration is required and the design is complicated because wavelengths are different in each of the optical cross-connect portions. FIG. 18 shows the case of the add-drop rate of ⅓.

Figure 19:
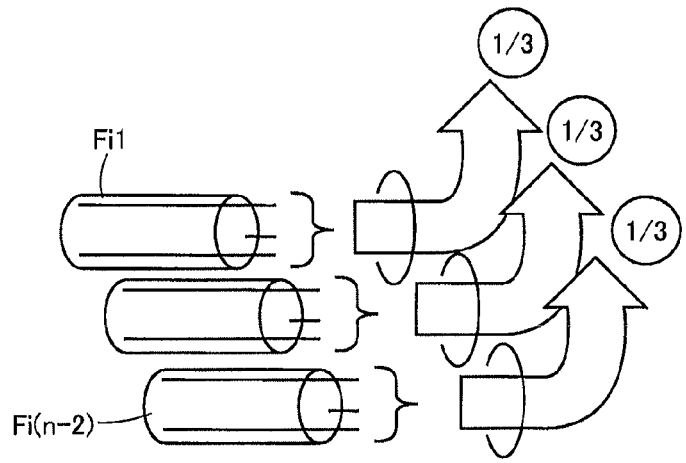
FIG. 19 is a schematic for explaining that the number of wavelengths is limited in accordance with a predetermined add-drop rate on the basis of the wavelengths in the input optical fibers.

As conceptually shown in FIG. 19, the total number of droppable wavelengths may be limited in accordance with a predetermined drop rate on the basis of the wavelengths making up the multiplexing signals transmitted through the plurality of the input optical fibers Fi1 to Fi(n−2). The total number of addable wavelengths may be limited in accordance with a predetermined add rate on the basis of the wavelengths making up the multiplexing signals added into the plurality of the output optical fibers Fo1 to Fo(n−2). In this case, the number or the scale can be made smaller in the tunable wavelength filters TF selecting a drop wavelength or the tunable wavelength filters TF outputting an add wavelength in the drop signal receiving apparatuses or the add signal sending apparatuses. FIG. 19 shows the case of the add-drop rate of ⅓.

Second Embodiment

Figure 20:
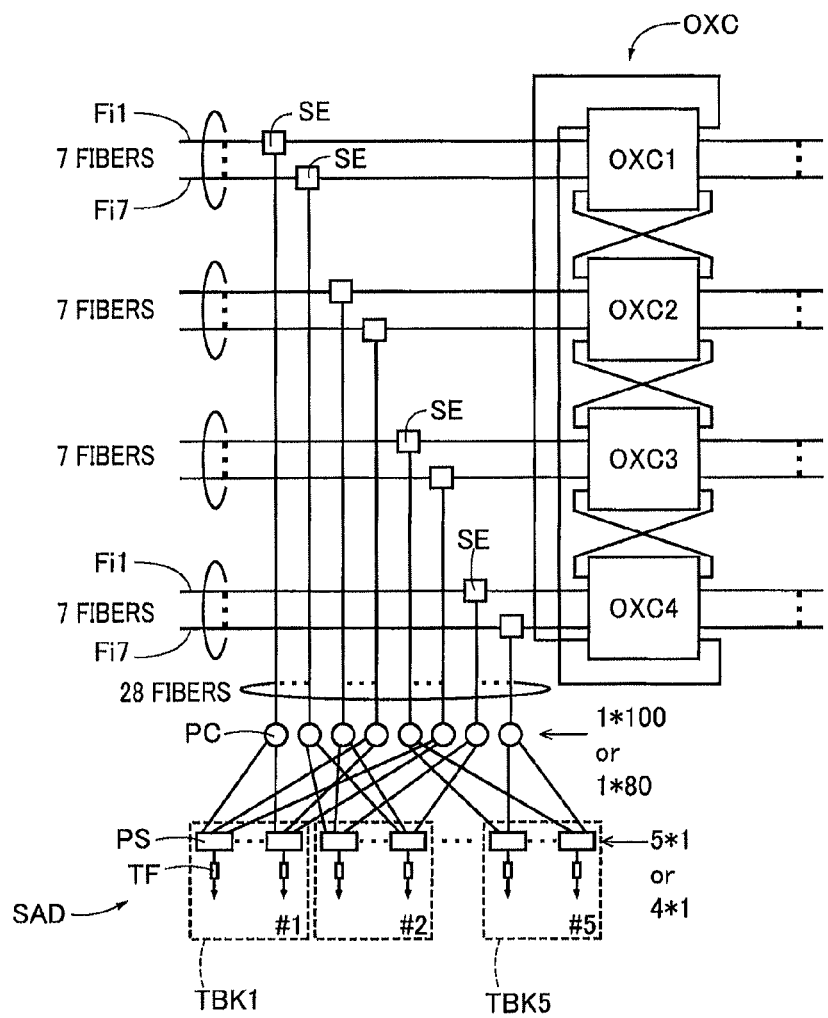
FIG. 20 is a diagram for explaining another configuration example of the optical add-drop apparatus to which the present invention is applied, corresponding to FIG. 10.

FIG. 20 is a diagram of another configuration example of the optical drop apparatus SDD, corresponding to FIG. 13. In the optical drop apparatus SDD shown in FIG. 20, the number of the transponder banks TBK is set independently of the number of the input optical fibers Fi1 to Fi(n−2) or the number of the optical cross-connect portions OXC1 to OXCs. In the example of FIG. 20, five transponder banks TBK1 to TBK5 are disposed, and the input optical fibers Fi1 to Fi(n−2) connected to the transponder banks TBK1 to TBK5 are randomly assigned such that the numbers of fibers become equal. The number of transponders included in the transponder banks TBK1 to TBK5 is arbitrarily set. In the optical drop apparatus SDD shown in FIG. 20, 28 1*80- or 1*100-photocouplers PC input multiplexing signals from any one of groups of input optical fibers Fi1 to Fi7 into any one of 112 5*1- or 4*1-optical switches PS in each of the transponder banks TBK1 to TBK5. Also in this embodiment, 28 optical amplifiers PA may be disposed on the input side of the 28 1*80- or 1*100-photocouplers PC. The optical drop apparatus SDD of this embodiment significantly reduces the numbers of the 1*80-photocouplers PC and the optical amplifiers PA, eliminates the need for the 28 1*8-photocouplers PC, and reduces the scale of the 560 optical switches PS from 28*1 to 4*1, thereby significantly reduces the overall scale.

Third Embodiment

Figure 21:
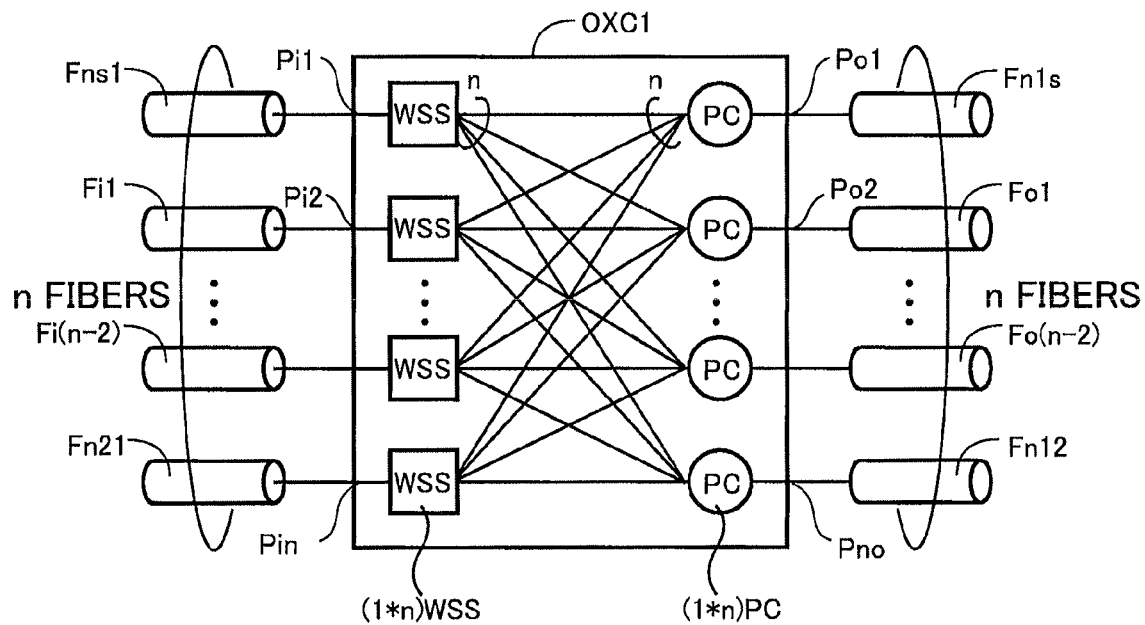
FIG. 21 is a diagram for explaining another configuration example of a plurality of the optical cross-connect portions included in the optical cross-connect apparatus, corresponding to FIG. 4.

FIG. 21 shows another example of the optical cross-connect portion OXC1 shown in FIG. 3. This optical cross-connect portion OXC1 of a third embodiment has multiple (n) 1*n-input-side wavelength selective switches WSS respectively connected to the internal connection optical fiber Fns1, the internode connection input optical fibers Fi1 to Fi(n−2), and the internal connection optical fiber Fn21 and receiving the input wavelength division multiplexing light to select a wavelength included in the wavelength division multiplexing light, and multiple (n) n*1-photocouplers PC respectively connected to the internal connection optical fiber Fn1s, the internode connection output optical fibers Fo1 to Fo(n−2), and the internal connection optical fiber Fn12 and receiving and multiplexing wavelength signals or wave band signals input from the 1*n input-side wavelength selective switches WSS to respectively output the signals to the internal connection optical fiber Fn1s, the internode connection output optical fibers Fo1 to Fo(n−2), and the internal connection optical fiber Fn12. In this way, the number of the expensive wavelength selective switches WSS can be reduced by half as is the case with the optical cross-connect portion OXC1 shown in FIG. 3.

Fourth Embodiment

Figure 22:
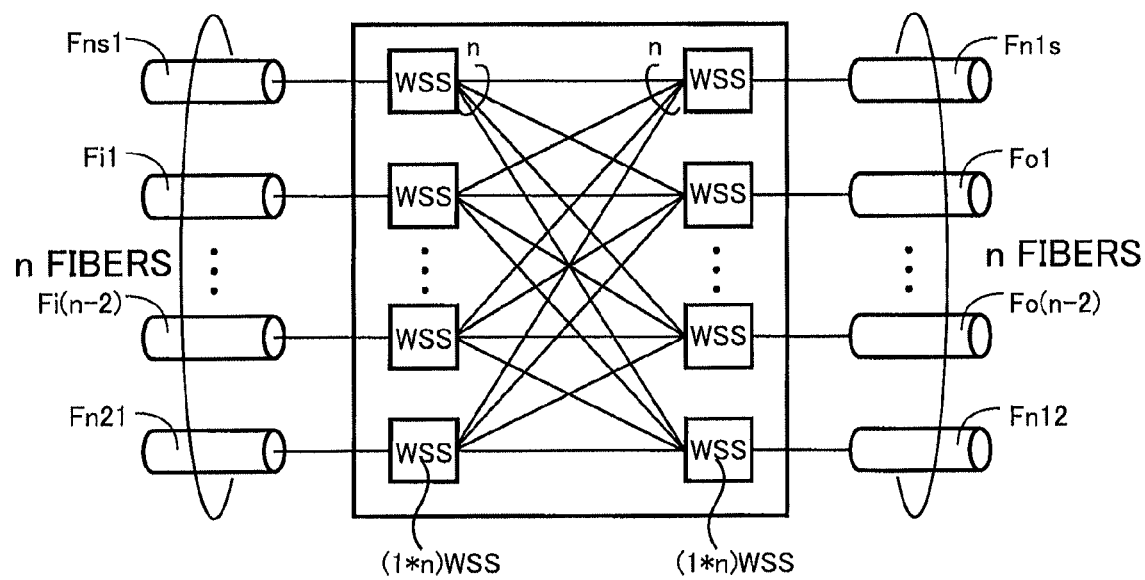
FIG. 22 is a diagram for explaining a further configuration example of a plurality of the optical cross-connect portions included in the optical cross-connect apparatus, corresponding to FIG. 4.

FIG. 22 shows a further example of the optical cross-connect portion OXC1 shown in FIG. 3. This optical cross-connect portion OXC1 of a fourth embodiment has multiple (n) 1*n-input-side wavelength selective switches WSS respectively connected to the internal connection optical fiber Fns1, the internode connection input optical fibers Fi1 to Fi(n−2), and the internal connection optical fiber Fns21 and receiving the input wavelength division multiplexing light to select a wavelength included in the wavelength division multiplexing light, and multiple (n) n*1-output-side wavelength selective switches WSS respectively connected to the internal connection optical fiber Fn1s, the internode connection output optical fibers Fo1 to Fo(n−2), and the internal connection optical fiber Fn12 and receiving and multiplexing wavelength signals or wave band signals input from the 1*n input-side wavelength selective switches WSS to respectively output the signals to the internal connection optical fiber Fn1s, the internode connection output optical fibers Fo1 to Fo(n−2), and the internal connection optical fiber Fn12. In this way, the optical loss is reduce in the optical cross-connect portion OXC1 since no photocoupler is used.

Although the embodiments of the present invention have been described with reference to the drawings, the present invention is applicable in other forms.

For example, although the optical drop apparatus SDD and the optical add apparatus SAD are included in the node ND0 as the optical add-drop apparatus in the embodiments, either the optical drop apparatus SDD or the optical add apparatus SAD may be included.

The number of the multiple optical cross-connect portions making up the optical cross-connect apparatus OXC may be any number including two, three, and four. Although the multiple optical cross-connect portions are internally connected like a ring, the optical cross-connect portions may internally be connected like a chain.

Although not exemplarily illustrated one by one, the present invention may variously be modified without departing from the spirit thereof.

NOMENCLATURE OF ELEMENTS

NW: optical network
ND0 to NDd: optical node
SDD: optical drop apparatus (optical add-drop apparatus)
SE: optical branch element (a 1*2-photocoupler or a 1*2-wavelength selective switch)
SAD: optical add apparatus (optical add-drop apparatus)
TBK1 to TBKs: transponder banks (drop signal receiving apparatuses, add signal receiving apparatuses)
OXC: optical cross-connect apparatus
OXC1 to OXC4: optical cross-connect portion
OXC1 to OXCs: optical cross-connect portion
WSS: wavelength selective switch
PC: photocouplers
PS: optical switch
Fi1 to Fin: input optical fibers (internode connection optical fibers)
Fo1 to Fon: output optical fibers (internode connection optical fibers)
Pi2 to Pi(n−1): internode connection input ports
Po2 to Po(n−1): internode connection output ports
Pi1, Pin: internal connection input port
Po1, Pon: internal connection output port

The invention claimed is:
1. An optical apparatus disposed in an optical node of a network comprising:
an optical add-drop apparatus that drops a desired signal from a plurality of input optical fibers input to an optical cross-connect apparatus disposed in the optical node in the optical network or adds a desired signal into a plurality of output optical fibers output from the optical cross-connect apparatus, the optical add-drop apparatus comprising:
a plurality of photocouplers connected to a part of or all of the input optical fibers connected to each of multiple optical cross-connect portions; and
a plurality of drop signal receiving apparatuses each:
having a group of optical switches each receiving signal outputs from a group of photocouplers connected to respective different optical cross-connect portions of the multiple optical cross-connect portions out of the plurality of photocouplers and alternately selecting a signal output; and
selecting a signal of a desired wavelength for each of signals respectively output from the group of optical switches; and the optical cross-connect apparatus including the multiple optical cross-connect portions, each optical cross-connect portion:

having wavelength selective switches routing wavelength division multiplexing signals on the basis of wavelength, having internode connection input ports, and internode connection output ports respectively connected to a part of the plurality of input optical fibers and a part of the plurality of output optical fibers;

having an internal connection input port and an internal connection output port; and, being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion.

2. An optical apparatus disposed in an optical node of a network comprising:

an optical add-drop apparatus that drops a desired signal from a plurality of input optical fibers input to an optical cross-connect apparatus disposed in the optical node in the optical network or adds a desired signal into a plurality of output optical fibers output from the optical cross-connect apparatus, the optical add-drop apparatus comprising:

a plurality of photocouplers connected to a part of or all of the output optical fibers connected to each of multiple optical cross-connect portions; and a plurality of add signal sending apparatuses each having a group of optical switches outputting a signal of a desired wavelength to any one of photocouplers in a group of photocouplers connected to respective different optical cross-connect portions of the multiple optical cross-connect portions out of the plurality of photocouplers, and alternatively selecting a signal output; and the optical cross-connect apparatus including the multiple optical cross-connect portions, each optical cross-connection portion:

having wavelength selective switches routing wavelength division multiplexing signals on the basis of wavelength, having internode connection input ports, and internode connection output ports respectively connected to a part of the plurality of input optical fibers and a part of the plurality of output optical fibers;

having an internal connection input port and an internal connection output port; and being connected such that an internal connection output port of a predetermined optical cross-connect portion is directly connected to an internal connection input port of another optical cross-connect portion and is indirectly connected via said another optical cross-connect portion to an internal connection output port of a further optical cross-connect portion.

3. The optical apparatus according to claim 1, wherein the number of groups of optical switches is equal to the number of the input optical fibers input to the optical cross-connect portion or the number of the output optical fibers output from the optical cross-connect portion.

4. The optical apparatus according to claim 2, wherein the number of groups of optical switches is equal to the number of the input optical fibers input to the optical cross-connect portion or the number of the output optical fibers output from the optical cross-connect portion.

5. The optical apparatus according to claim 3, wherein the number of fibers connected from the input optical fibers of the optical cross-connect portion to a drop signal receiving apparatus is common to all the optical cross-connect portions.

6. The optical apparatus according to claim 4, wherein the number of fibers connected from an add signal sending apparatus to the output optical fibers of the optical cross-connect portion is common to all the optical cross-connect portions.

7. The optical apparatus according to claim 5, the number of the fibers to the drop signal receiving apparatus from the optical cross-connect portion is determined based on a rate of normalized traffic and/or a blocking rate of the optical node when a drop rate of the optical node is fixed to a predetermined value.

8. The optical apparatus according to claim 6, the number of the fibers from the add signal sending apparatus to the optical cross-connect portion is determined based on a rate of normalized traffic and/or a blocking rate of the optical node when an add rate of the optical node is fixed to a predetermined value.

* * * * *